US011151701B2

(12) United States Patent
Hsu et al.

(10) Patent No.: US 11,151,701 B2
(45) Date of Patent: Oct. 19, 2021

(54) IMAGE GRID LINE REMOVING METHOD AND SYSTEM THEREOF

(71) Applicant: NATIONAL CHUNG CHENG UNIVERSITY, Chiayi (TW)

(72) Inventors: Wei-Yen Hsu, Chiayi (TW); Chi-Jui Chung, Chiayi (TW); Wen-Yen Lin, Chiayi (TW)

(73) Assignee: NATIONAL CHUNG CHENG UNIVERSITY, Chiayi (TW)

( * ) Notice: Subject to any disclaimer, the term of this patent is extended or adjusted under 35 U.S.C. 154(b) by 169 days.

(21) Appl. No.: 16/568,274

(22) Filed: Sep. 12, 2019

(65) Prior Publication Data
US 2020/0380650 A1    Dec. 3, 2020

(30) Foreign Application Priority Data
May 28, 2019   (TW) .................................. 108118440

(51) Int. Cl.
| | |
|---|---|
| *G06T 7/37* | (2017.01) |
| *G06T 5/10* | (2006.01) |
| *G06T 5/00* | (2006.01) |
| *G06T 3/40* | (2006.01) |
| *G06T 7/70* | (2017.01) |

(52) U.S. Cl.
CPC .............. *G06T 5/10* (2013.01); *G06T 3/4015* (2013.01); *G06T 3/4084* (2013.01); *G06T 5/003* (2013.01); *G06T 7/37* (2017.01); *G06T 7/70* (2017.01); *G06T 2207/20056* (2013.01)

(58) Field of Classification Search
CPC ......... G06T 5/10; G06T 5/003; G06T 3/4015; G06T 7/37; G06T 7/70; G06T 3/4084; G06T 2207/20056; G06T 5/002
See application file for complete search history.

(56) References Cited

U.S. PATENT DOCUMENTS

| | | | | |
|---|---|---|---|---|
| 2007/0003125 | A1* | 1/2007 | Behiels ................ | A61B 6/5258 382/132 |
| 2012/0002194 | A1* | 1/2012 | Roth .................. | G01N 15/1456 356/213 |
| 2014/0219536 | A1* | 8/2014 | Takahashi ................. | G06T 5/10 382/132 |
| 2017/0294001 | A1* | 10/2017 | Zhang ..................... | G06T 5/005 |

FOREIGN PATENT DOCUMENTS

| | | |
|---|---|---|
| CN | 104486534 A | 4/2015 |
| TW | I594193 B | 8/2017 |

* cited by examiner

*Primary Examiner* — Siamak Harandi
(74) *Attorney, Agent, or Firm* — CKC & Partners Co., LLC

(57) ABSTRACT

An image grid line removing method is used for removing grid lines of an image and includes a Fourier transform step, a Gaussian-like masking step and an inverse Fourier transform step. The Fourier transform step is for providing a Fourier transform to process the image to generate a frequency domain image. The Gaussian-like masking step is for providing a Gaussian-like masking model to process the frequency domain image to generate a frequency domain masked image. The inverse Fourier transform step is for providing an inverse Fourier transform to process the frequency domain masked image to generate a grid line removing image.

6 Claims, 11 Drawing Sheets

IMAGE GRID LINE REMOVING METHOD AND SYSTEM THEREOF

RELATED APPLICATIONS

This application claims priority to Taiwan Application Serial Number 108118440, filed May 28, 2019, which is herein incorporated by reference.

BACKGROUND

Technical Field

The present disclosure relates to an image grid line removing method and a system thereof. More particularly, the present disclosure relates to an image grid line removing method and a system thereof which can effectively remove the mage grid line formed by black matrices of color filters.

Description of Related Art

In recent years, digital imaging devices have been at least partially attributed to the fact that such devices are becoming more and more affordable for the average consumer and become increasingly popular. Furthermore, in addition to multiple independent digital cameras currently available on the market, it is not uncommon to integrate a digital imaging device into a portion of another electronic device (such as: desktop or laptop, cellular phone or portable media player).

Most digital imaging devices include image sensors in order to obtain image data. The image sensor provides a plurality of light detecting elements configured to convert light detected by the image sensor into an electrical signal (example: photodetector). The image sensor also can include a color filter array, and the color filter array filters the light captured from the image sensor to capture color information. The image data captured by the image sensor can then be processed by an image processing pipeline. The image processing pipeline can apply a lot of various image processing operations to the image data for generating a full-color image that can be displayed for viewing on a display device such as a monitor.

In the image grid line removing method, although the conventional image processing technology can blur the image through the Gaussian mask model in the time domain to remove the image defect. However, for the grid line in the image, the removal effect is often not good enough to meet the needs and applications of the users. It can be seen that there is a lack of image grid line removing method and system thereof which can effectively remove the grid lines to reduce the misjudgment of automated inspection on the currently market, and the related companies are seeking solutions.

SUMMARY

According to an embodiment of the present disclosure, an image grid line removing method is used for removing a grid line of an image. The image grid line removing method includes a Fourier transform step, a Gaussian-like masking step and an inverse Fourier transform step. The Fourier transform step provides a Fourier transform to process the image to generate a frequency domain image. The Gaussian-like masking step provides a Gaussian-like masking model to process the frequency domain image to generate a frequency domain masked image. The inverse Fourier transform step provides an inverse Fourier transform to process the frequency domain masked image to generate a grid line removing image.

According to an embodiment of the present disclosure, a system of an image grid line removing method is used for removing a grid line of an image. The system of the image grid line removing method includes a memory and an arithmetic unit. The memory accesses the image, the frequency domain image, the frequency domain masked image and the grid line removing image. The arithmetic unit is electrically connected to the memory. The arithmetic unit includes a Fourier transform module, a Gaussian-like masking module and an inverse Fourier transform module. The Fourier transform module receives the image and processes the image according to the Fourier transform to produce the frequency domain image. The Gaussian-like masking module is electrically connected to the Fourier transform module and receives the frequency domain image. The Gaussian-like masking module processes the frequency domain image according to a Gaussian-like masking model to produce the frequency domain masked image. The inverse Fourier transform module is electrically connected to the Gaussian-like masking module and receives the frequency domain masked image. The inverse Fourier transform module processes the frequency domain masked image according to the inverse Fourier transform to produce the grid line removing image.

BRIEF DESCRIPTION OF THE DRAWINGS

The present disclosure can be more fully understood by reading the following detailed description of the embodiment, with reference made to the accompanying drawings as follows.

DETAILED DESCRIPTION

The embodiment will be described with the drawings. For clarity, some practical details will be described below. However, it should be noted that the present disclosure should not be limited by the practical details, that is, in some embodiment, the practical details is unnecessary. In addition, for simplifying the drawings, some conventional structures and elements will be simply illustrated, and repeated elements may be represented by the same labels.

It will be understood that when an element (or device) is referred to as be "connected to" another element, it can be directly connected to the other element, or it can be indirectly connected to the other element, that is, intervening elements may be present. In contrast, when an element is referred to as be "directly connected to" another element, there are no intervening elements present. In addition, the terms first, second, third, etc. are used herein to describe various elements or components, these elements or components should not be limited by these terms. Consequently, a first element or component discussed below could be termed a second element or component.

Figure 1:
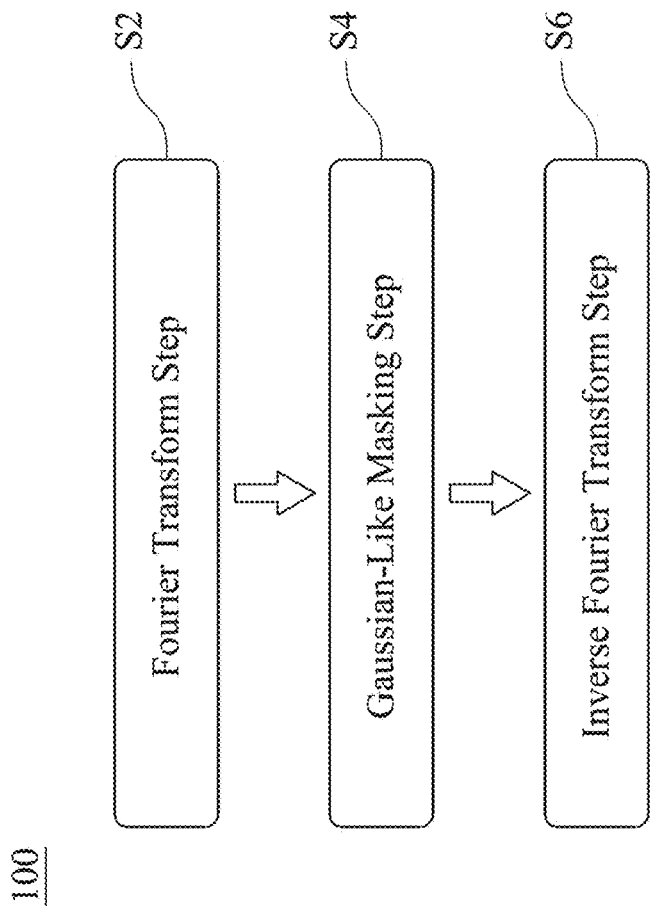
FIG. 1 is a process schematic view of an image grid line removing method according to the present disclosure.
Figure 2:
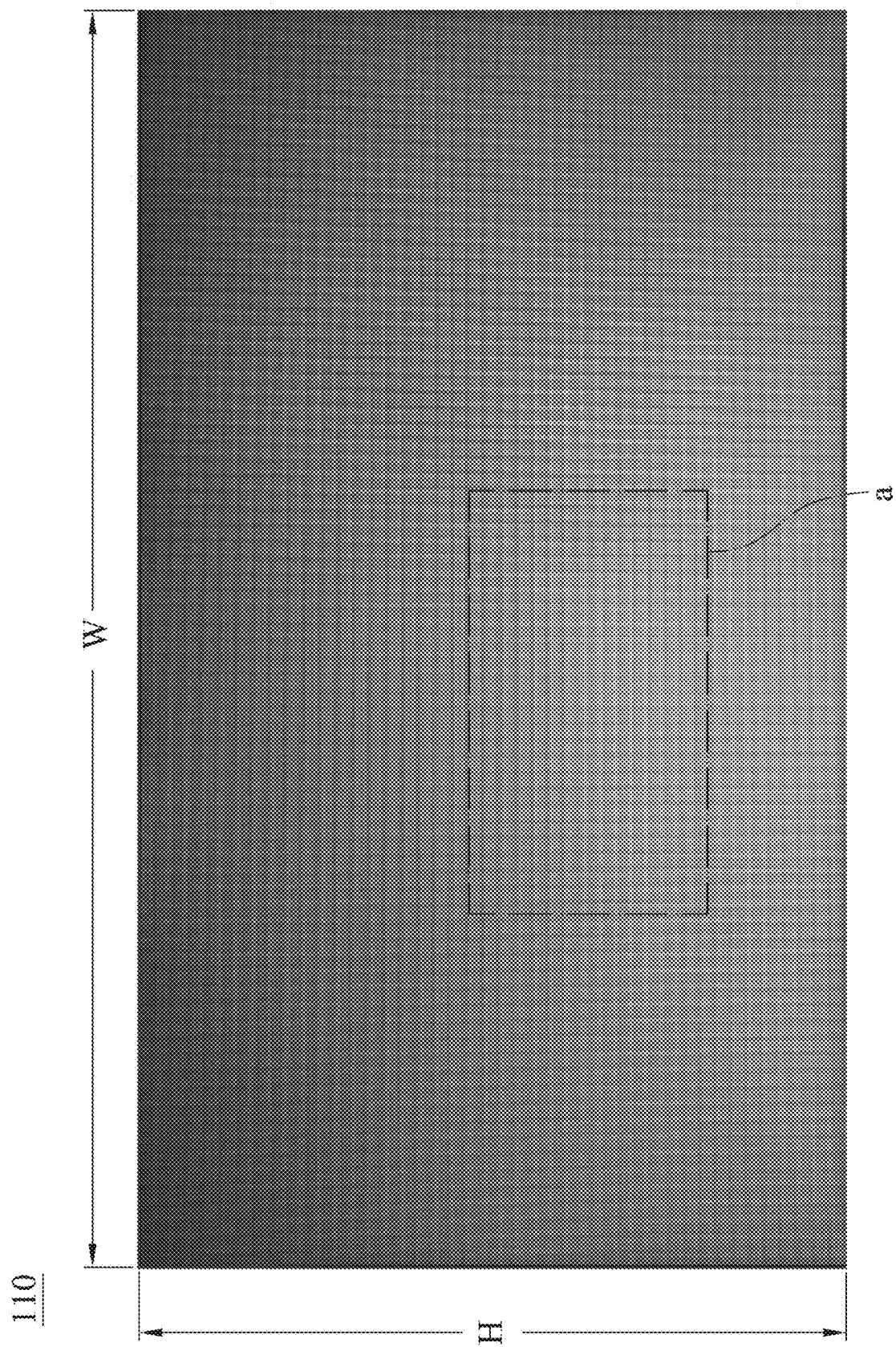
FIG. 2 is a schematic view of an image according to a Fourier transform step of FIG. 1.
Figure 3:
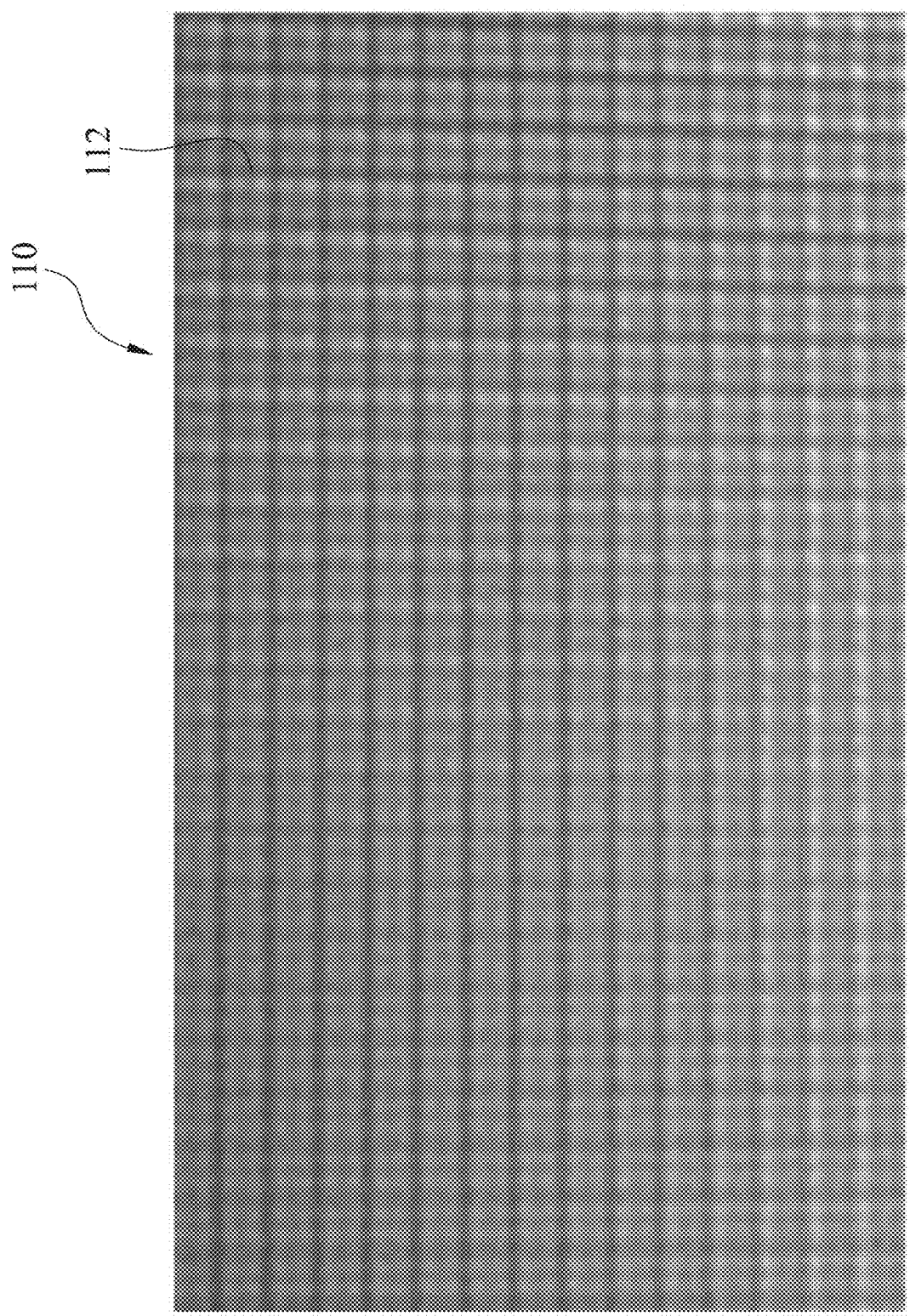
FIG. 3 is a partial enlarged schematic view of a portion according to the image of FIG. 2.
Figure 4:
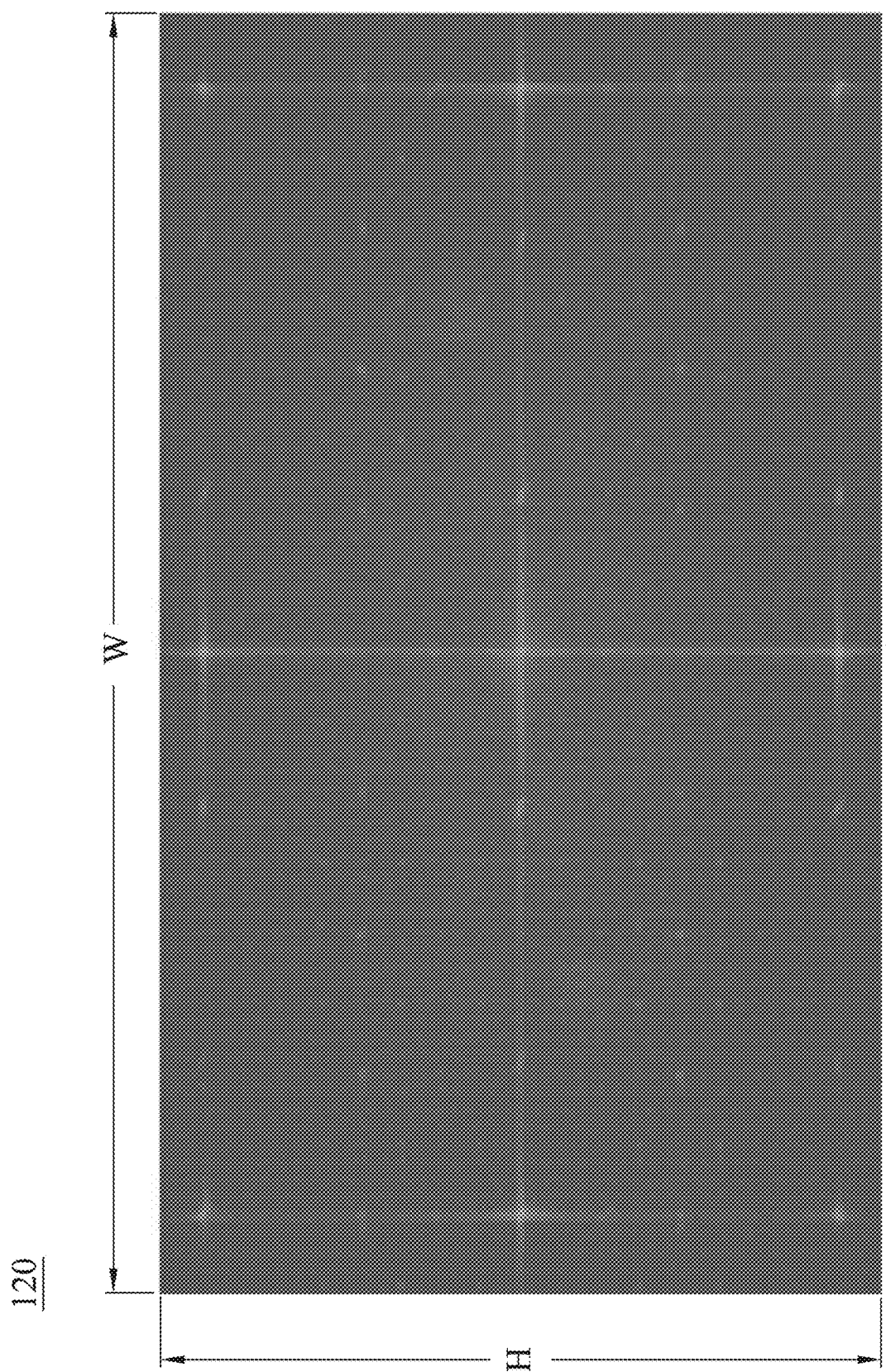
FIG. 4 is a schematic view of a frequency domain image according to the Fourier transform step of FIG. 1.
Figure 5:
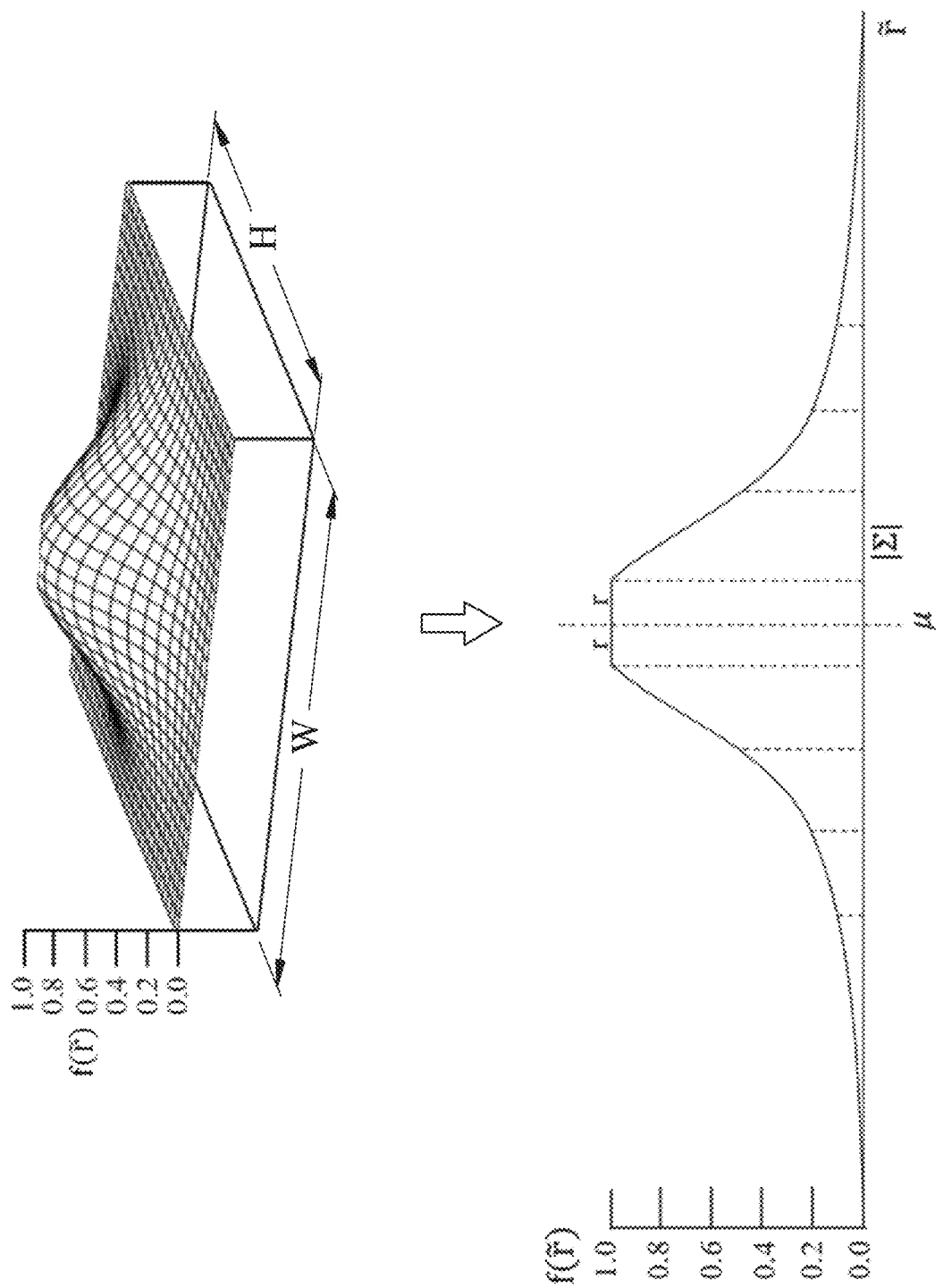
FIG. 5 is a schematic view of a first type Gaussian-like masking model according to a Gaussian-like masking step of FIG. 1.
Figure 6:
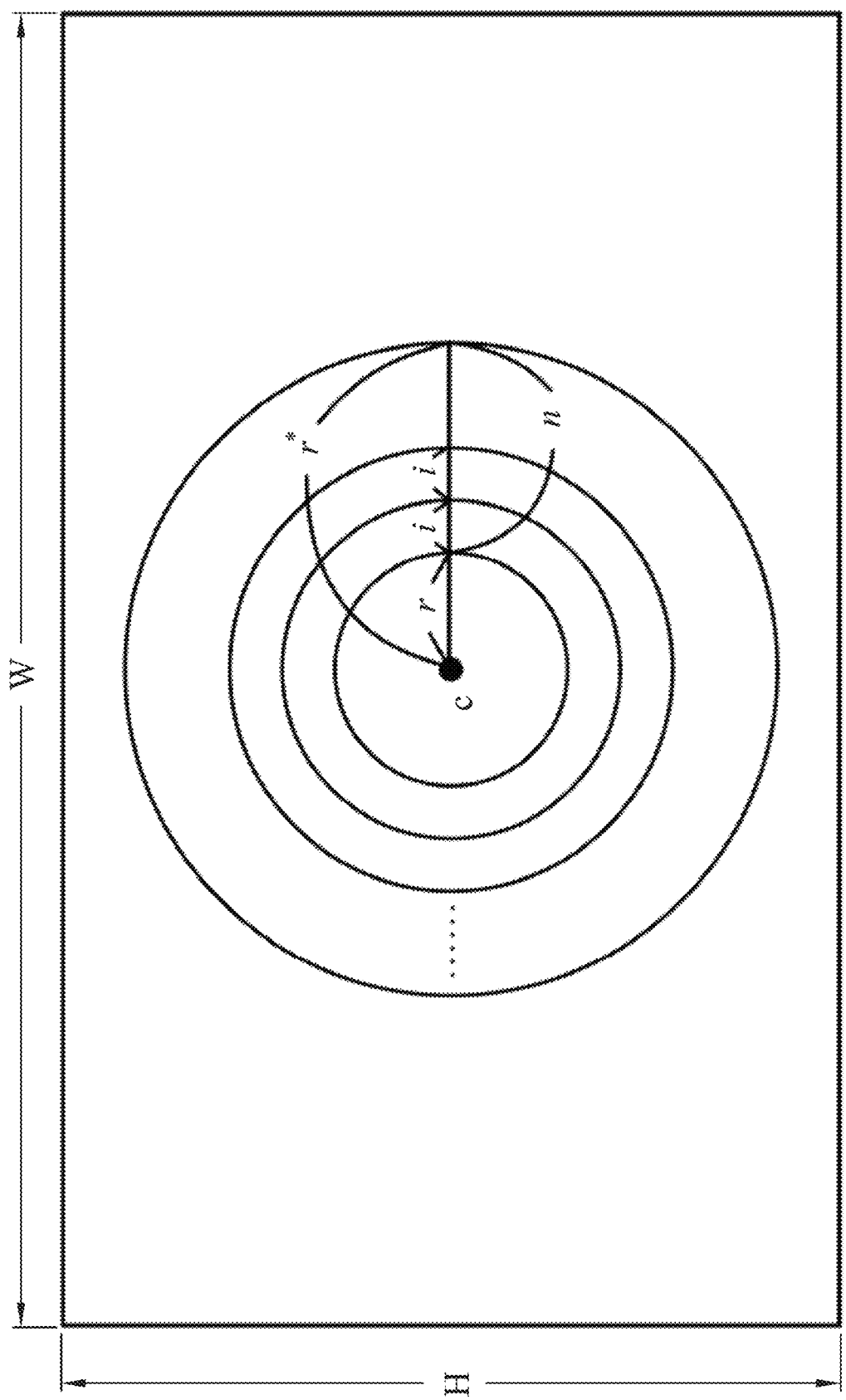
FIG. 6 is a schematic view of a second type Gaussian-like masking model according to the Gaussian-like masking step of FIG. 1.
Figure 7:
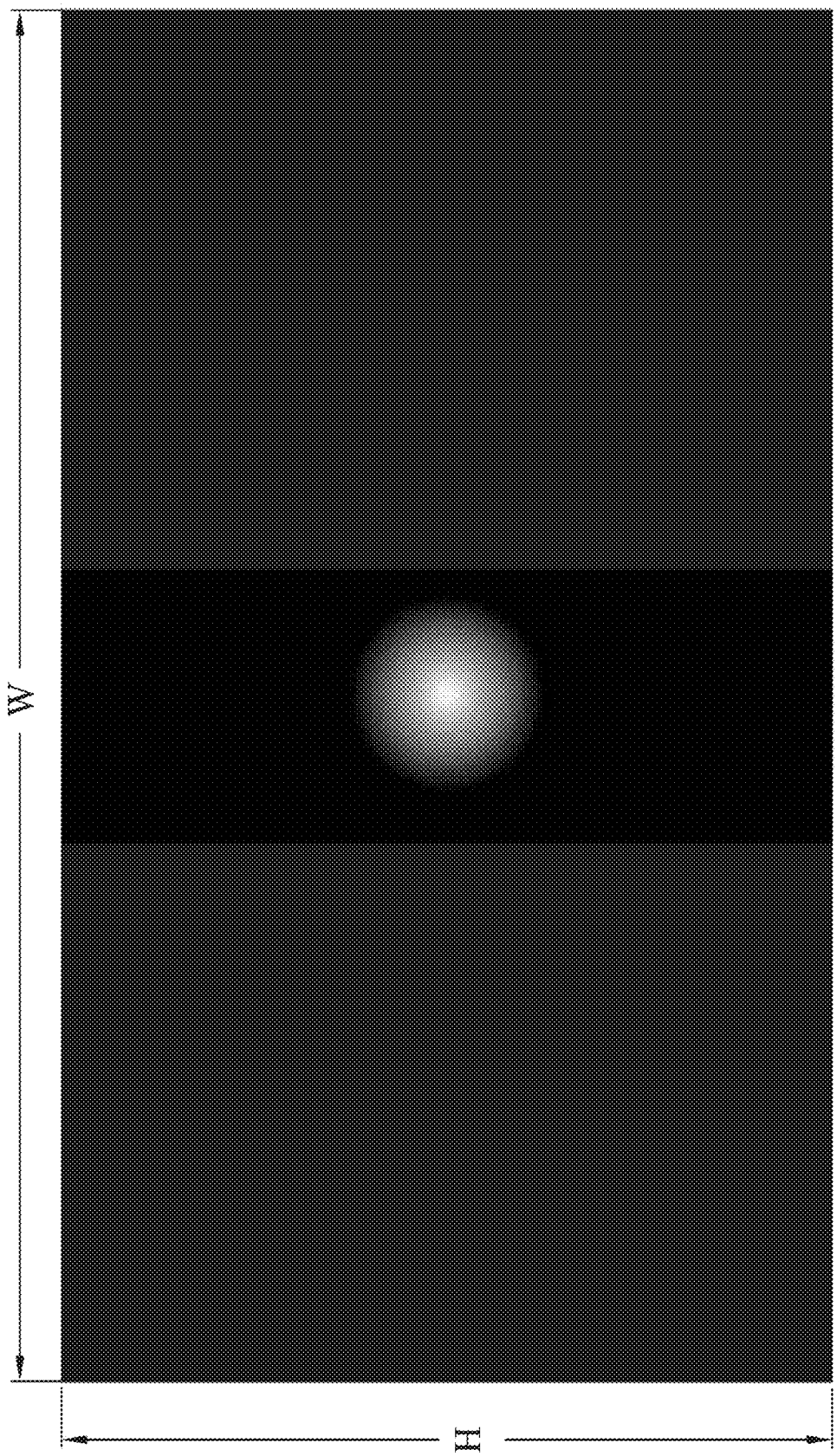
FIG. 7 is a masking diagram according to the second type Gaussian-like masking model of FIG. 6.
Figure 8:
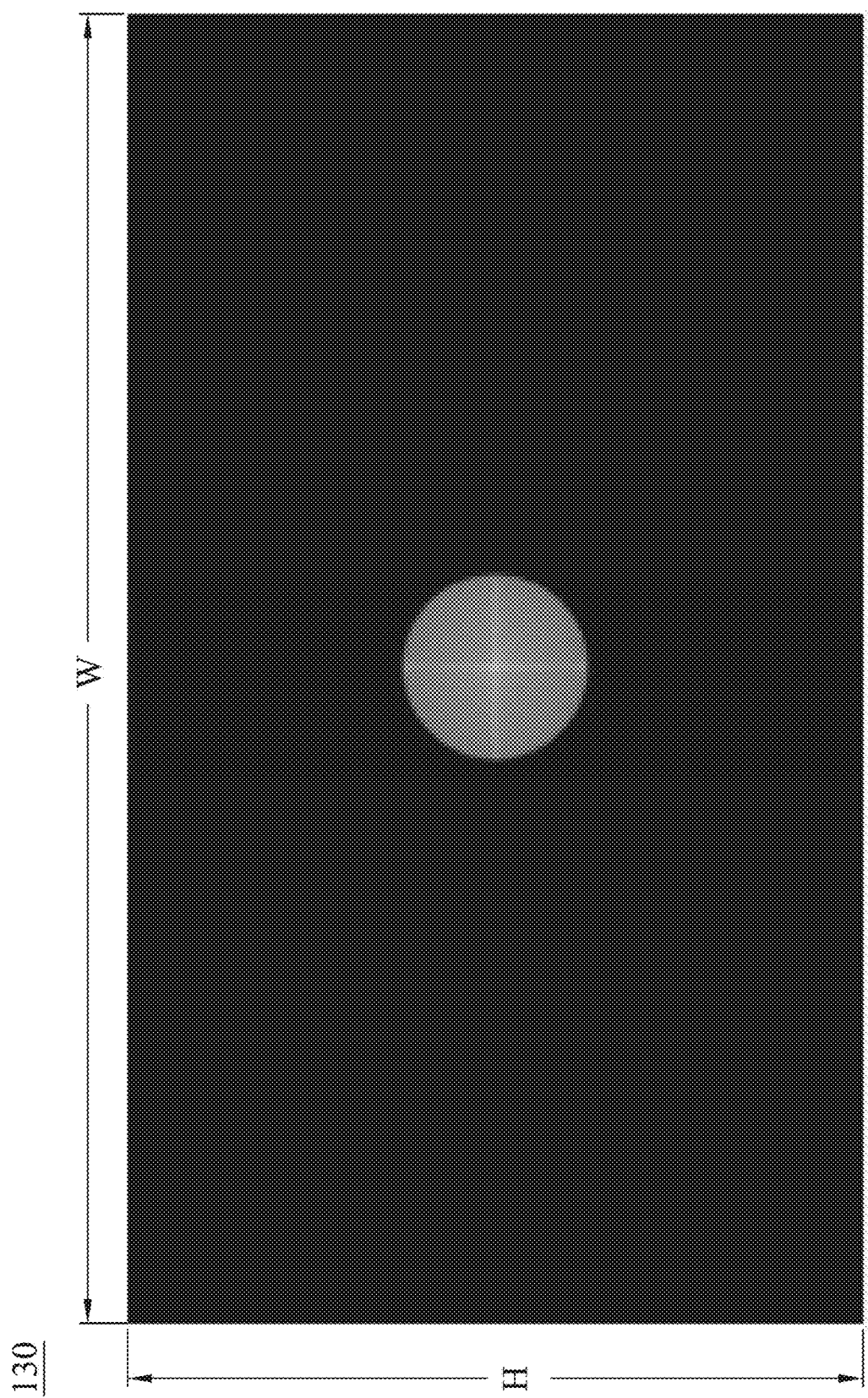
FIG. 8 is a schematic view of a frequency domain masked image according to the Gaussian-like masking step of FIG. 1.
Figure 9:
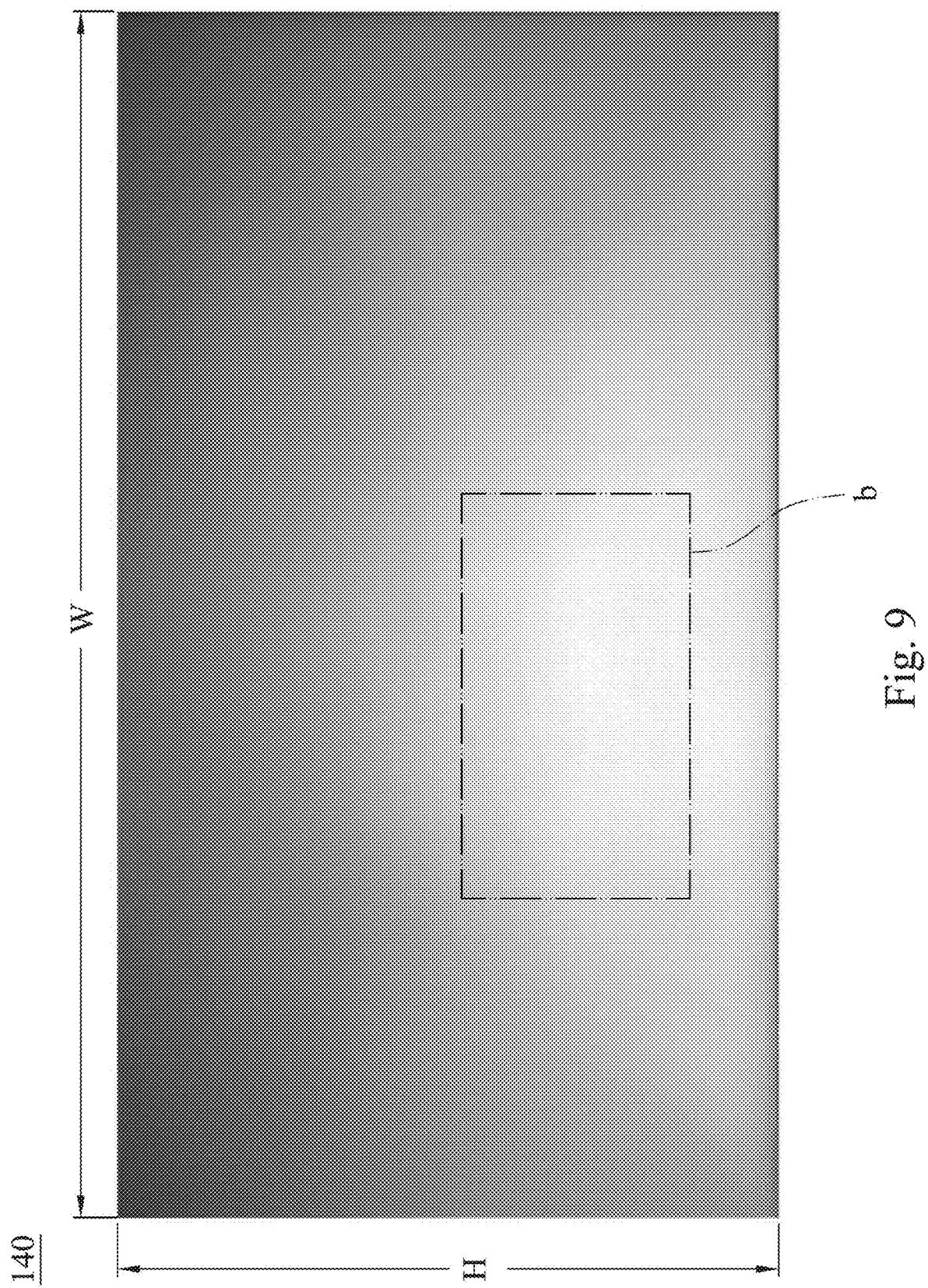
FIG. 9 is a schematic view of the grid line removing image according to an inverse Fourier transform step of FIG. 1.
Figure 10:
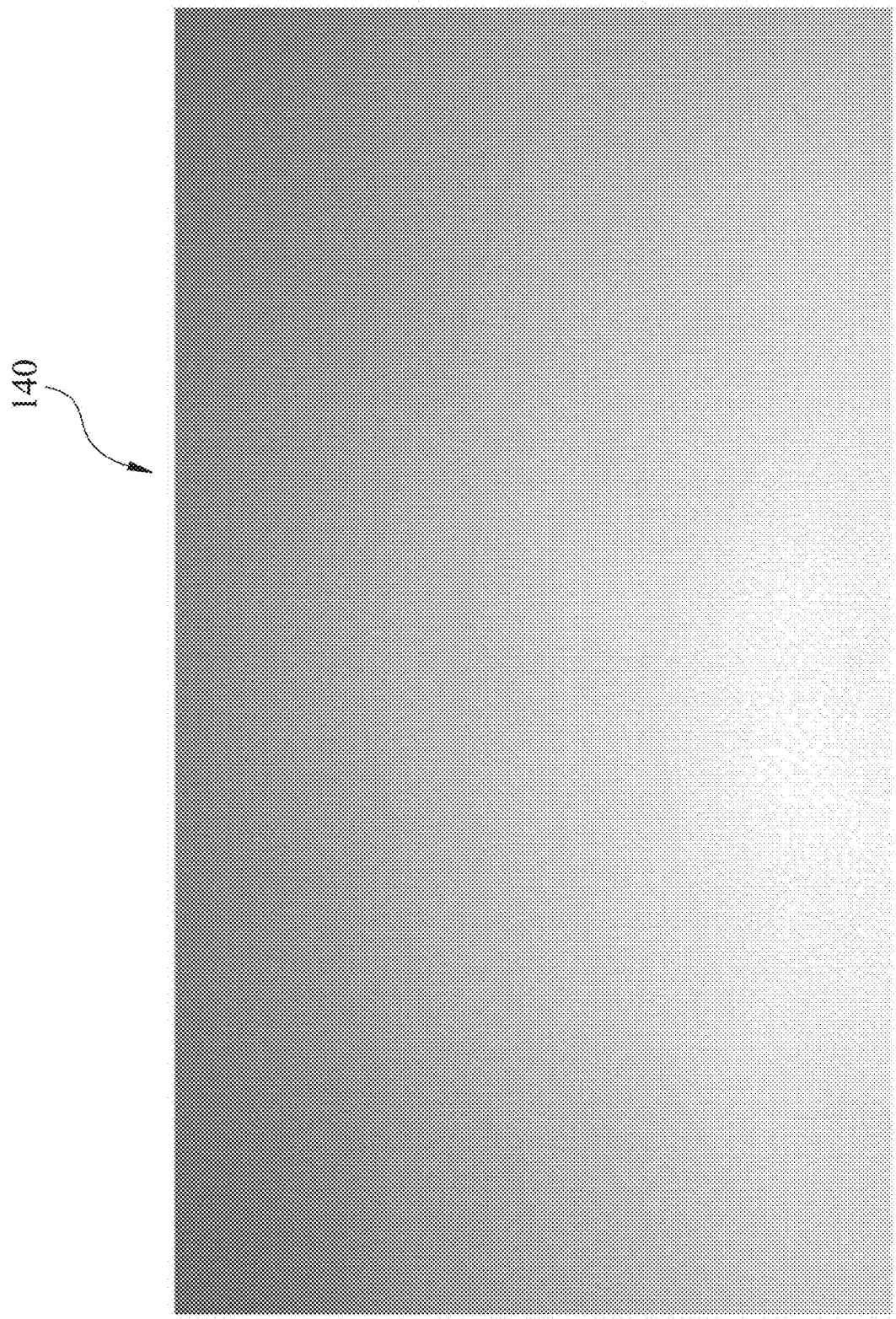
FIG. 10 is a partial enlarged schematic view of a portion according to the grid line removing image of FIG. 9.
Figure 11:
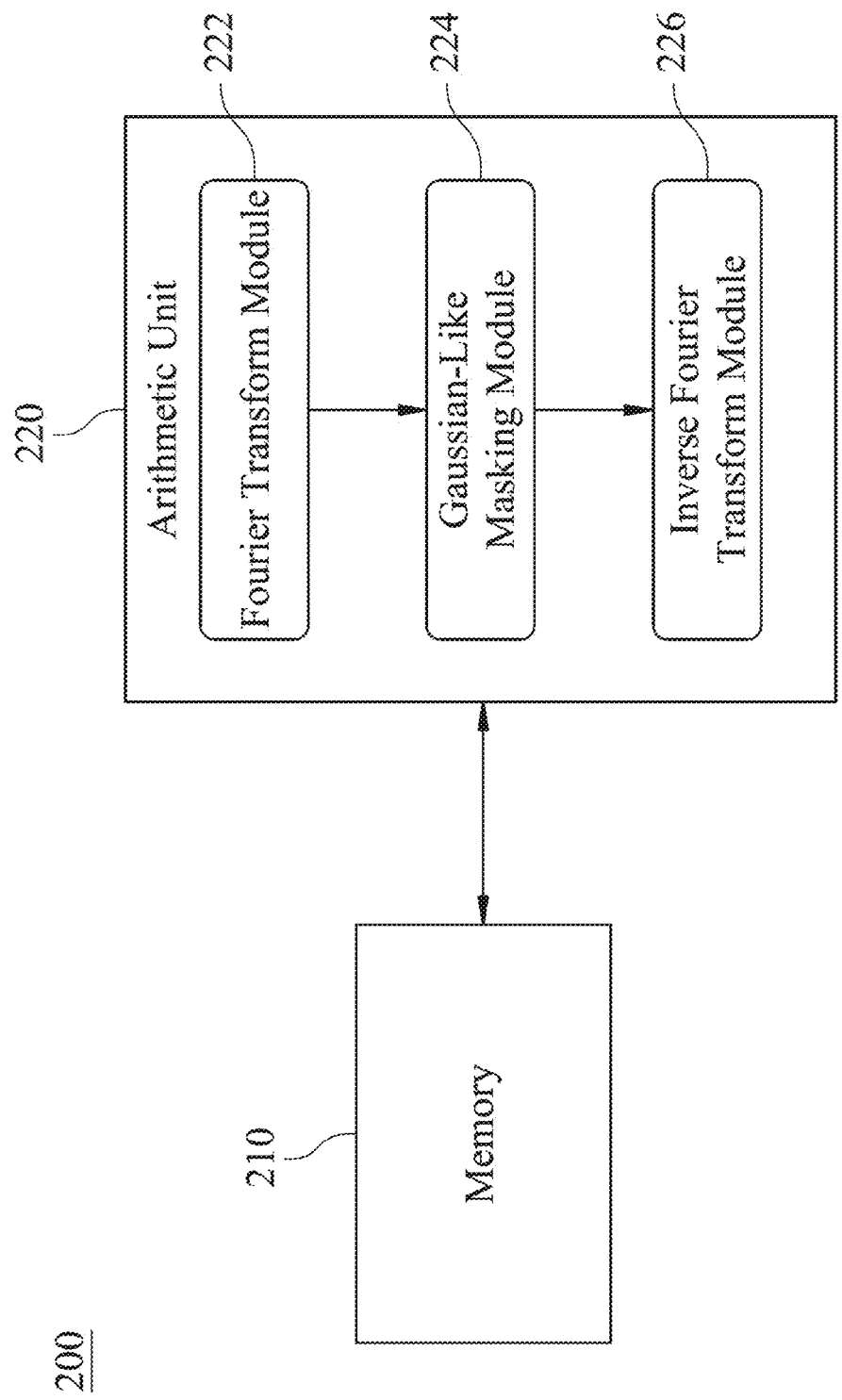
FIG. 11 is a system block schematic view of the image grid line removing method according to another embodiment of the present disclosure.

FIG. 1 is a process schematic view of an image grid line removing method 100 according to the present disclosure. FIG. 2 is a schematic view of an image 110 according to a Fourier transform step S2 of FIG. 1. FIG. 3 is a partial enlarged schematic view of a portion (a) according to the image 110 of FIG. 2. FIG. 4 is a schematic view of a frequency domain image 120 according to the Fourier transform step S2 of FIG. 1. FIG. 5 is a schematic view of a first type Gaussian-like masking model according to a Gaussian-like masking step S4 of FIG. 1. FIG. 6 is a schematic view of a second type Gaussian-like masking model according to the Gaussian-like masking step S4 of FIG. 1. FIG. 7 is a masking diagram according to the second type Gaussian-like masking model of FIG. 6. FIG. 8 is a schematic view of a frequency domain masked image 130 according to the Gaussian-like masking step S4 of FIG. 1. FIG. 9 is a schematic view of the grid line removing image 140 according to an inverse Fourier transform step S6 of FIG. 1. FIG. 10 is a partial enlarged schematic view of a portion (b) according to the grid line removing image 140 of FIG. 9. As shown in illustration, the image grid line removing method 100 is used for removing the grid lines 112 of the image 110, and the image grid line removing method 100 includes the Fourier transform step S2, the Gaussian-like masking step S4 and the inverse Fourier transform step S6.

The Fourier transform step S2 provides a Fourier transform to process the image 110 to generate a frequency domain image 120. In detail, the Fourier transform is a linear integral transform that is used for transforming a signal between the time domain and the frequency domain. The image 110 has a width W, a height H, an image center point (c) and a plurality of pixel points, and the width W is greater than or equal to the height H. The grid line 112 of the image 110 is formed by a camera (CCD) shooting a panel. The panel includes a color filter, and the color filter includes a plurality of red filter regions, a plurality of green filter regions, a plurality of blue filter regions and a black matrix. The black matrix is located between any two of the red filter regions, the green filter regions and the blue filter regions. That is, because the image 110 taken by the camera is mainly composed of lines, it is applied to the special occasion of automatic detection for the defect, and the details of the image of the screen and the panel are more clearly captured. Therefore, when we focus on the color filter, we will capture the black edges (that is the black matrix) that separate the three primary colors (RGB), and the grid lines 112 are seen on the display (that is the image 110) of the camera in FIG. 3.

The Gaussian-like masking step S4 provides a Gaussian-like masking model to process the frequency domain image 120 to generate a frequency domain masked image 130. That is, an intensity value f($\tilde{r}$) of the Gaussian-like masking model is multiplied by a value of the frequency domain image 120 to obtain a value of the frequency domain masked image 130. In detail, the Gaussian-like masking model includes a reserved-area radius r, a position parameter $\tilde{r}$ and an intensity value f($\tilde{r}$). The reserved-area radius r is less than half of the height H. The position parameter $\tilde{r}$ represents a distance between each of the pixel points and the image center point (c), and the position parameter $\tilde{r}$ is less than or equal to half of the width W. When the position parameter $\tilde{r}$ is less than the reserved-area radius r, the intensity value f($\tilde{r}$) is equal to 1; otherwise, when the position parameter $\tilde{r}$ is greater than or equal to the reserved-area radius r, the intensity value f($\tilde{r}$) is less than or equal to 1. The present disclosure proposes two embodiments of the Gaussian masking model, and the following describes the details, respectively.

In FIG. 5, the first type Gaussian-like masking model includes a reserved-area radius, a mask center position, an interval width, a position parameter and an intensity value. The reserved-area radius is expressed as r, the mask center position is expressed as µ, the interval width is expressed as |Σ|, the position parameter is expressed as $\tilde{r}$, and the intensity value is expressed as f($\tilde{r}$) and conforms to a following formula (1):

$$f(\tilde{r}) = \begin{cases} \frac{1}{2\pi\sqrt{|\Sigma|}}\exp\left(-\frac{1}{2}(\tilde{r}-r-\mu)^T \sum^{-1}(\tilde{r}-r-\mu)\right), & \text{if } \tilde{r} \geq r \\ 1, & \text{if } 0 \leq \tilde{r} < r \end{cases} \quad (1)$$

In FIGS. 6 and 7, the second type Gaussian-like masking model includes a reserved-area radius, a total-length masked radius, a ring number, a ring-pitch width, a position parameter and an intensity value. The reserved-area radius is expressed as r, the total-length masked radius is expressed as r*, the ring number is expressed as n, the ring-pitch width is expressed as i, the position parameter is expressed as $\tilde{r}$, and the intensity value is expressed as f($\tilde{r}$) and conforms to a following formula (2):

$$f(\tilde{r}) = \begin{cases} 1 - \frac{1}{n}\left[\frac{\tilde{r}-r}{i}\right], & \text{if } r \leq \tilde{r} < r^* \\ 1, & \text{if } 0 \leq \tilde{r} < r \\ 0, & \text{if } r^* \leq \tilde{r} \end{cases} \quad (2)$$

Regardless of the first type Gaussian-like masking model or the second type Gaussian-like masking model, the present disclosure can achieve a masking effect. Therefore, in the first type Gaussian-like masking model, it is smoother between the intervals, so that the masking effect is better. In the second type Gaussian-like masking model, the computational complexity is lower, so that the operation speed is faster and the operation time is shorter, and the masking effect is higher. For the user, the present disclosure can select the desired one of the first type Gaussian-like masking model and the second type Gaussian-like masking model according to the requirements to remove the grid lines 112 of the image 110, so that the application is quite extensive.

The inverse Fourier transform step S6 provides an inverse Fourier transform to process the frequency domain masked image 130 to generate a grid line removing image 140. The inverse Fourier transform is a linear integral transform that is relative to the Fourier transform, and the inverse Fourier transform is used for transforming signals between the frequency domain and the time domain. In the portion (a) of FIG. 2 and the portion (b) of FIG. 9, the difference between the grid line removing image 140 and the image 110 is that the grid line removing image 140 does not have the grid line. Therefore, the image grid line removing method 100 of the present disclosure can effectively remove the grid lines 112 of the image 110 by the interaction among the Fourier transform step S2, the Gaussian-like masking step S4 and the inverse Fourier transform step S6.

In FIGS. 1 to 11, FIG. 11 is a system 200 block schematic view of the image grid line removing method 100 according to another embodiment of the present disclosure. The system 200 of the image grid line removing method 100 is used for removing the grid lines 112 of the image 110, and the system 200 of the image grid line removing method 100 includes a memory 210 and an arithmetic unit 220.

The memory 210 accesses the image 110, the frequency domain image 120, the frequency domain masked image 130 and the grid line removing image 140. The arithmetic unit 220 is electrically connected to the memory 210. The arithmetic unit 220 includes a Fourier transform module 222, a Gaussian-like masking module 224 and an inverse Fourier transform module 226. The Fourier transform module 222 receives the image 110 and processes the image 110 according to the Fourier transform to produce the frequency domain image 120. The Fourier transform module 222 is used for executing Fourier transform step S2. Moreover, the Gaussian-like masking module 224 is electrically connected to the Fourier transform module 222 and receives the frequency domain image 120. The Gaussian-like masking module 224 processes the frequency domain image 120 according to the Gaussian-like masking model to produce the frequency domain masked image 130; that is, an intensity value f(r̃) of the Gaussian-like masking model is multiplied by a value of the frequency domain image 120 to obtain a value of the frequency domain masked image 130. The Gaussian-like masking module 224 is used for executing the Gaussian-like masking step S4. Therefore, the inverse Fourier transform module 226 is electrically connected to the Gaussian-like masking module 224 and receives the frequency domain masked image 130. The inverse Fourier transform module 226 processes the frequency domain masked image 130 according to the inverse Fourier transform to produce the grid line removing image 140. The inverse Fourier transform module 226 is used for executing the inverse Fourier transform step S6. Therefore, the system 200 of the image grid line removing method 100 of the present disclosure can effectively remove the grid lines 112 of the image 110 by using special conversions and operations of the Fourier transform module 222 of the arithmetic unit 220, the Gaussian-like masking module 224 and the inverse Fourier transform module 226.

According to the above embodiments, the present disclosure has the following advantages: First, it is favorable for removing the grid lines of the image by the interaction among the Fourier transform step, the Gaussian-like masking step and the inverse Fourier transform step. Second, in the first type Gaussian-like masking model, it is smoother between the intervals, so that the masking effect is better. In the second type Gaussian-like masking model, the computational complexity is lower, so that the operation speed is faster and the operation time is shorter, and the masking effect is higher. For the user, the present disclosure can select the desired Gaussian-like masking model according to the requirements to remove the grid lines of the image, so that the application is quite extensive. Third, it is favorable for removing the grid lines of the image via the interaction by using special conversions and operations of the Fourier transform module of the arithmetic unit, the Gaussian-like masking module and the inverse Fourier transform module.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. An image grid line removing method, which is used for removing a grid line of an image, the image grid line removing method comprising:
   a Fourier transform step providing a Fourier transform to process the image to generate a frequency domain image;
   a Gaussian-like masking step providing a Gaussian-like masking model to process the frequency domain image to generate a frequency domain masked image; and
   an inverse Fourier transform step providing an inverse Fourier transform to process the frequency domain masked image to generate a grid line removing image;
   wherein the Gaussian-like masking model is one of a first type Gaussian-like masking model and a second type Gaussian-like masking model;
   wherein the first type Gaussian-like masking model comprises a reserved-area radius, a mask center position, an interval width, a position parameter and an intensity value, the reserved-area radius is expressed as r, the mask center position is expressed as $\mu$, the interval width is expressed as $|\Sigma|$, the position parameter is expressed as $\tilde{r}$, and the intensity value is expressed as $f(\tilde{r})$ and conforms to a following formula:

$$f(\tilde{r}) = \begin{cases} \dfrac{1}{2\pi\sqrt{|\Sigma|}} \exp\left(-\dfrac{1}{2}(\tilde{r}-r-\mu)^T \Sigma^{-1} (\tilde{r}-r-\mu)\right), & \text{if } \tilde{r} \geq r \\ 1, & \text{if } 0 \leq \tilde{r} < r \end{cases} ;$$

wherein the second type Gaussian-like masking model comprises the reserved-area radius, a total-length masked radius, a ring number, a ring-pitch width, the position parameter and the intensity value, the reserved-area radius is expressed as r, the total-length masked radius is expressed as r*, the ring number is expressed as n, the ring-pitch width is expressed as i, the position parameter is expressed as $\tilde{r}$, and the intensity value is expressed as $f(\tilde{r})$ and conforms to a following formula:

$$f(\tilde{r}) = \begin{cases} 1 - \dfrac{1}{n}\left[\dfrac{\tilde{r}-r}{i}\right], & \text{if } r \leq \tilde{r} < r^* \\ 1, & \text{if } 0 \leq \tilde{r} < r \\ 0, & \text{if } r^* \leq \tilde{r} \end{cases} .$$

2. The image grid line removing method of claim 1, wherein the Gaussian-like masking model comprises the reserved-area radius, the position parameter and the intensity value, and the image comprises a width, a height, an image center point and a plurality of pixel points, and the width is greater than or equal to the height, and the reserved-area radius is less than half of the height, and the position parameter represents a distance between each of the pixel points and the image center point, and the position parameter is less than or equal to half of the width;

wherein when the position parameter is less than the reserved-area radius, the intensity value is equal to 1; and when the position parameter is greater than or equal to the reserved-area radius, the intensity value is less than or equal to 1.

3. The image grid line removing method of claim 1, wherein the grid line of the image is formed by a camera shooting a panel, the panel comprises a color filter, and the color filter comprises at least one red-filtering portion, at least one green-filtering portion, at least one blue-filtering portion and a black matrix, and the black matrix is disposed between any two of the at least one red-filtering portion, the at least one green-filtering portion and the at least one blue-filtering portion.

4. A system of an image grid line removing method, which is used for removing the grid line of the image, the system of the image grid line removing method comprising:

a memory accessing the image, the frequency domain image, the frequency domain masked image and the grid line removing image; and an arithmetic unit electrically connected to the memory, comprising:

a Fourier transform module receiving the image and processing the image according to the Fourier transform to produce the frequency domain image;

a Gaussian-like masking module electrically connected to the Fourier transform module and receiving the frequency domain image, wherein the Gaussian-like masking module processes the frequency domain image according to a Gaussian-like masking model to produce the frequency domain masked image; and an inverse Fourier transform module electrically connected to the Gaussian-like masking module and receiving the frequency domain masked image, wherein the inverse Fourier transform module processes the frequency domain masked image according to the inverse Fourier transform to produce the grid line removing image;

wherein the Gaussian-like masking model is one of a first type Gaussian-like masking model and a second type Gaussian-like masking model;

wherein the first type Gaussian-like masking model comprises a reserved-area radius, a mask center position, an interval width, a position parameter and an intensity value, the reserved-area radius is expressed as r, the mask center position is expressed as μ, the interval width is expressed as |Σ|, the position parameter is expressed as $\tilde{r}$, and the intensity value is expressed as f($\tilde{r}$) and conforms to a following formula:

$$f(\tilde{r}) = \begin{cases} \frac{1}{2\pi\sqrt{|\Sigma|}} \exp\left(-\frac{1}{2}(\tilde{r}-r-\mu)^T \sum^{-1} (\tilde{r}-r-\mu)\right), & \text{if } \tilde{r} \geq r \\ 1, & \text{if } 0 \leq \tilde{r} < r \end{cases} ;$$

wherein the second type Gaussian-like masking model comprises the reserved-area radius, a total-length masked radius, a ring number, a ring-pitch width, the position parameter and the intensity value, the reserved-area radius is expressed as r, the total-length masked radius is expressed as r*, the ring number is expressed as n, the ring-pitch width is expressed as i, the position parameter is expressed as $\tilde{r}$, and the intensity value is expressed as f($\tilde{r}$) and conforms to a following formula:

$$f(\tilde{r}) = \begin{cases} 1 - \frac{1}{n}\left[\frac{\tilde{r}-r}{i}\right], & \text{if } r \leq \tilde{r} < r^* \\ 1, & \text{if } 0 \leq \tilde{r} < r \\ 0, & \text{if } r^* \leq \tilde{r} \end{cases} .$$

5. The system of the image grid line removing method of claim 4, wherein the Gaussian-like masking model comprises the reserved-area radius, the position parameter and the intensity value, and the image comprises a width, a height, an image center point and a plurality of pixel points, and the width is greater than or equal to the height, and the reserved-area radius is less than half of the height, and the position parameter represents a distance between each of the pixel points and the image center point, and the position parameter is less than or equal to half of the width;

wherein when the position parameter is less than the reserved-area radius, the intensity value is equal to 1; and when the position parameter is greater than or equal to the reserved-area radius, the intensity value is less than or equal to 1.

6. The system of the image grid line removing method of claim 4, wherein the grid line of the image is formed by a camera shooting a panel, the panel comprises a color filter, and the color filter comprises at least one red-filtering portion, at least one green-filtering portion, at least one blue-filtering portion and a black matrix, and the black matrix is disposed between any two of the at least one red-filtering portion, the at least one green-filtering portion and the at least one blue-filtering portion.

\* \* \* \* \*